United States Patent [19]

Guichard

[11] Patent Number: 5,024,637

[45] Date of Patent: Jun. 18, 1991

[54] AUTOMATIC MECHANICAL TRANSMISSION APPARATUS WITH CONTINUOUS VARIATION OF THE TRANSMISSION RATIO FROM AN INFINITE RATIO UP TO A RATIO LESS THEN 1/1

[76] Inventor: Louis Guichard, 10, Impasse Henry Bouchard, 21000 Dijon, France

[21] Appl. No.: 525,919

[22] Filed: May 21, 1990

[30] Foreign Application Priority Data

May 24, 1989 [FR] France .................... 89 06804

[51] Int. Cl.$^5$ .................................... F16H 3/70
[52] U.S. Cl. ........................... 475/166; 74/64; 475/186
[58] Field of Search ............... 74/64; 475/165, 166, 475/172, 185, 186

[56] References Cited

U.S. PATENT DOCUMENTS

| | | | |
|---|---|---|---|
| 2,003,825 | 6/1935 | Derrah | 475/172 |
| 4,179,943 | 12/1979 | Gamba | 74/64 |
| 4,478,100 | 10/1984 | Sfredda | 475/172 |
| 4,742,722 | 5/1988 | Wallace | 74/64 |
| 4,924,730 | 5/1990 | Parsons | 475/166 |

FOREIGN PATENT DOCUMENTS

| | | |
|---|---|---|
| 0172557 | 2/1986 | European Pat. Off. |
| 1188137 | 9/1959 | France. |
| 85521 | 5/1985 | Japan ............ 475/165 |

*Primary Examiner*—Dwight Diehl
*Attorney, Agent, or Firm*—McAulay Fisher Nissen Goldberg & Kiel

[57] ABSTRACT

This invention relates to an automatic mechanical transmission apparatus with continuous variation of the transmission ratio from an infinite ratio up to a ratio less than 1/1, of the type employing centrifugal forces, comprising at least one driven plate bearing at least one continuous circular track, eccentric with respect to the common axis of the driving and driven shafts, and rollers which roll inside the circular track, being mounted to rotate about respective longitudinal axes, each of these rollers being borne by a rod connected to a pivot pin on the driving hub, characterized in that each rod bearing a roller is articulated on the outer part of a weight which is itself articulated on the hub fast with the driving shaft.

10 Claims, 5 Drawing Sheets

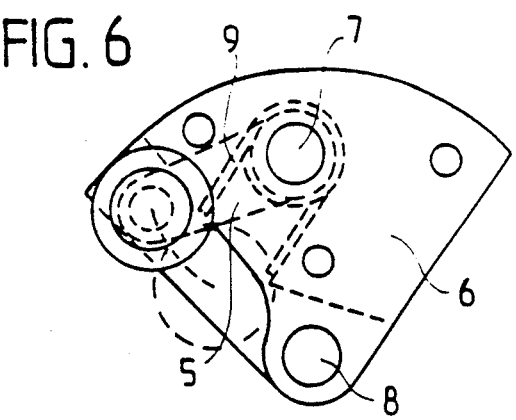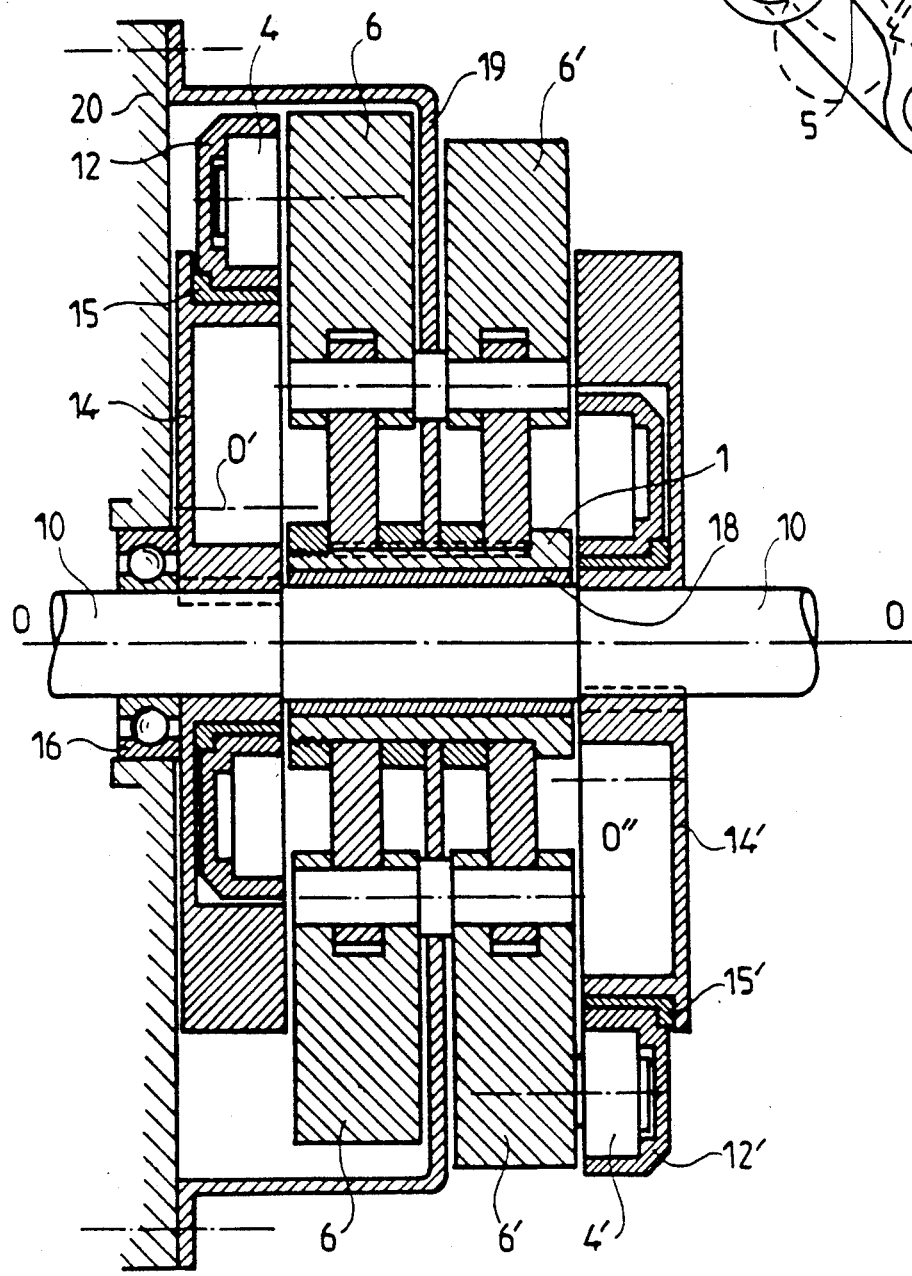

AUTOMATIC MECHANICAL TRANSMISSION APPARATUS WITH CONTINUOUS VARIATION OF THE TRANSMISSION RATIO FROM AN INFINITE RATIO UP TO A RATIO LESS THEN 1/1

FIELD OF THE INVENTION

The present invention relates to an automatic mechanical transmission apparatus with continuous variation of the transmission ratio from an infinite ratio up to a ratio less than 1/1, of the type employing centrifugal forces.

BACKGROUND OF THE INVENTION

Such a known apparatus, as described in Patent EP-A 0 172 557, comprises a driving shaft and a driven shaft, which are coaxial, a driving plate driven by the driving shaft, a driven plate fast with the driven shaft and bearing a continuous circular track eccentric with respect to the common axis of the driving and driven shafts, rollers which roll inside the circular track, each of these rollers being borne by a rod articulated, about a pivot axis, on the driving plate, the articulations of all the rods being uniformly distributed over a circle whose center lies on the common axis of the two coaxial shafts. Another known apparatus of this type comprises two independent assemblies of rollers, tracks, rods, articulations and driving plates, these two assemblies having eccentric axes diametrically opposite with respect to the common axis of the driving and driven shafts.

In these known apparatus, a diameter A,A' (FIG. 1) passing through axis 0 common to the driving and driven shafts and through axis 0' of the eccentric circular track determines, on this track, two semi-circumferences. In one semi-circumference A.A', the axis of each roller moves towards the axis 0 of the driving and driven shafts, whilst, in the other semi-circumference A'.A, the axis of each roller moves away from this axis 0. During the displacement between points A' and A, the roller undergoes an acceleration and an increase in its kinetic energy. Such acceleration is obtained by the driving force of the rod by the driving shaft and further to the angular position of the rod with respect to the tangent to the path determined by the track, this driving force has for its effect to reduce the centrifugal efforts of the roller in rotation on the semi-circumference A'A. On the contrary, during the displacement of point A to point A', along the opposite semi-circumference, the roller undergoes a deceleration and a reduction in its kinetic energy and likewise further to the angular position of the rod, such deceleration produces a thrust of the rod and an increase in the efforts of the rollers on the track when they rotate on this semi-circumference A.A'. The effects of such reductions of the efforts on the path A'.A and of such increases of the efforts on the path A.A' add up to exert on axis 0' of the track a torque which is transmitted to the driven shaft of axis 0. When the receiver begins to rotate then accelerates, the torques transmitted decrease as a function in particular of the difference in the speeds between the driving shaft and the receiver. This effect is translated by a reduction in the frequency of the accelerations and decelerations previously indicated. These torques tend towards a zero value when these speeds are equal and when the transmission ratio approaches 1/1, then they become negative and increasing when this ratio is less than 1/1.

Furthermore, when the motor rotates, the rollers are subjected to continuous centrifugal forces which are exerted in all directions around the common axis 0. These centrifugal forces produce positive torques on axis 0' during the path from A towards A' and negative ones during the path from A' towards A. It will be observed that, further to the angular position of the rods with respect to the track, the distribution of the number of the rollers and consequently of the active masses, is unequal between the two semi-circumferences A.A' and A'.A, these active masses being more numerous on the path of A towards A'. The positive torques transmitted in part A.A' are then always greater than the negative torques transmitted in part A'.A. As a result, even when the ratio of the speeds is 1/1 and when the torques due to the accelerations and decelerations no longer exist, torques due solely to the centrifugal forces and to the unequal distribution of the tollers are always transmitted, the importance of these torques being a function of the speed of the motor/receiver assembly.

The torques transmitted by the apparatus are in the first place the torques produced as a function of the increases and reductions in kinetic energy which are due, as explained previously, to the accelerations and decelerations of the rollers. These torques, which are the most important at start-up, decrease when the transmission ratio decreases and they tend towards a zero value on approaching the ratio 1/1. Moreover with the ratio 1/1, the torques are transmitted further to the unequal distribution of the number of rollers and the centrifugal forces between the semi-circumferences A.A' and A'.A.

This being so, any modification of the speeds and the driving torques reacts instantaneously on the transmission ratios and on the receiving torques and thus automatically adapts these different parameters to the operational conditions of the apparatus.

However, the heretofore known apparatus of this type present numerous drawbacks. In fact, as the rollers roll on the track, in numerous situations as a function of the centrifugal forces developed, the rollers leave the track and fall on the driving shaft and, when the centrifugal forces increase, sometimes suddenly, the rollers are then rejected against the track. This results in repeated shocks which damage these members of the apparatus. The rollers are not heavy enough to provide sufficiently powerful centrifugal forces and the eccentricities between axis 0' of the track and the central axis 0 are too reduced to give the apparatus great efficiency. The apparatus present a considerable volume especially when they comprise at least two assemblies of rollers, tracks and driving plates in order to be balanced.

An attentive examination of FIG. 1 will show that, in fact, the accelerations of the rollers in the semi-circumference A'A are produced only up to position A" located before position A, and the deceleration of the rollers effectively begins at position A" and continues, passing through A up to position A'. This zone of deceleration between A" and A unfortunately produces negative torques on axis 0' of the track, which cause part of the effect of the positive torques produced during the path in acceleration from A' to A", to be lost.

It is an object of the present invention to overcome these drawbacks by producing an apparatus having the greatest efficiency in a reduced volume.

SUMMARY OF THE INVENTION

This object is attained, according to the invention, in that the apparatus comprises, on the driven plate, a second circular track, coaxial and inside the first track and on which each roller may roll externally, the two coaxial tracks allowing the rollers only a very small clearance therebetween.

According to a complementary feature of the invention, each rod is articulated, not directly on the driving plate, but on a heavy weight which is itself articulated on the driving plate, and a spring disposed between the rod and the weight allows the weight/rod/roller assembly to pass zone A".A without noteworthy deceleration and to transfer the decelerations and corresponding torques in the positive zone A.A'.

According to another complementary feature of the invention, each weight is rendered heavier in its outer part most remote from its articulation, on the driving plate, and the center of gravity of the heavy outer part of the weight is offset with respect to the straight line joining the center of the roller and the center of the articulation on the driving plate, and this forwardly in the direction of the displacement in rotation of the roller, with a view to increasing the forces of traction on the rod, intended to reduce the centrifugal efforts on the semi-circumference A'A.

According to another complementary feature of the invention, in order to allow large angular clearances of the rods and weights, resulting from the considerable eccentricities used, each rod/weight assembly is disposed laterally with respect to the roller and is placed, with respect to this roller, on the driving plate side.

The apparatus according to the invention presents a certain number of advantages. In the first place, it makes it possible to obtain a wide range of automatic continuous variation of the transmission ratio from the zero output speed up to beyond the ratio 1/1, which dispenses with using a clutch or coupling device between the driving shaft and the variable speed drive. Furthermore, the output torques upon start-up may be much greater than the nominal driving torque. It also allows an automatic adaptation of the ratios of the speeds and the torques to the optimum operational conditions. Its design is remarkably simple; it offers a considerable facility of manufacture and adaptation; its cost price is low; it presents a perfect dynamic balancing; it has a very good mechanical yield, a very small space requirement; it is robust and reliable and it enables the receiver to be retained by the motor. It also makes it possible to limit the range of variation of the speed ratio to the value 1/1 or a pre-displayed value. The apparatus according to the invention may be applied to very diverse power transmissions.

BRIEF DESCRIPTION OF THE DRAWINGS

The invention will be more readily understood on reading the following description with reference to the accompanying drawings, in which:

FIG. 5 is a view in axial section of another embodiment of the apparatus according to the invention.

FIG. 6 is a front view of a variant embodiment of a weight/rod/roller/spring assembly.

DETAILED DESCRIPTION OF THE DRAWINGS

Figure 1:
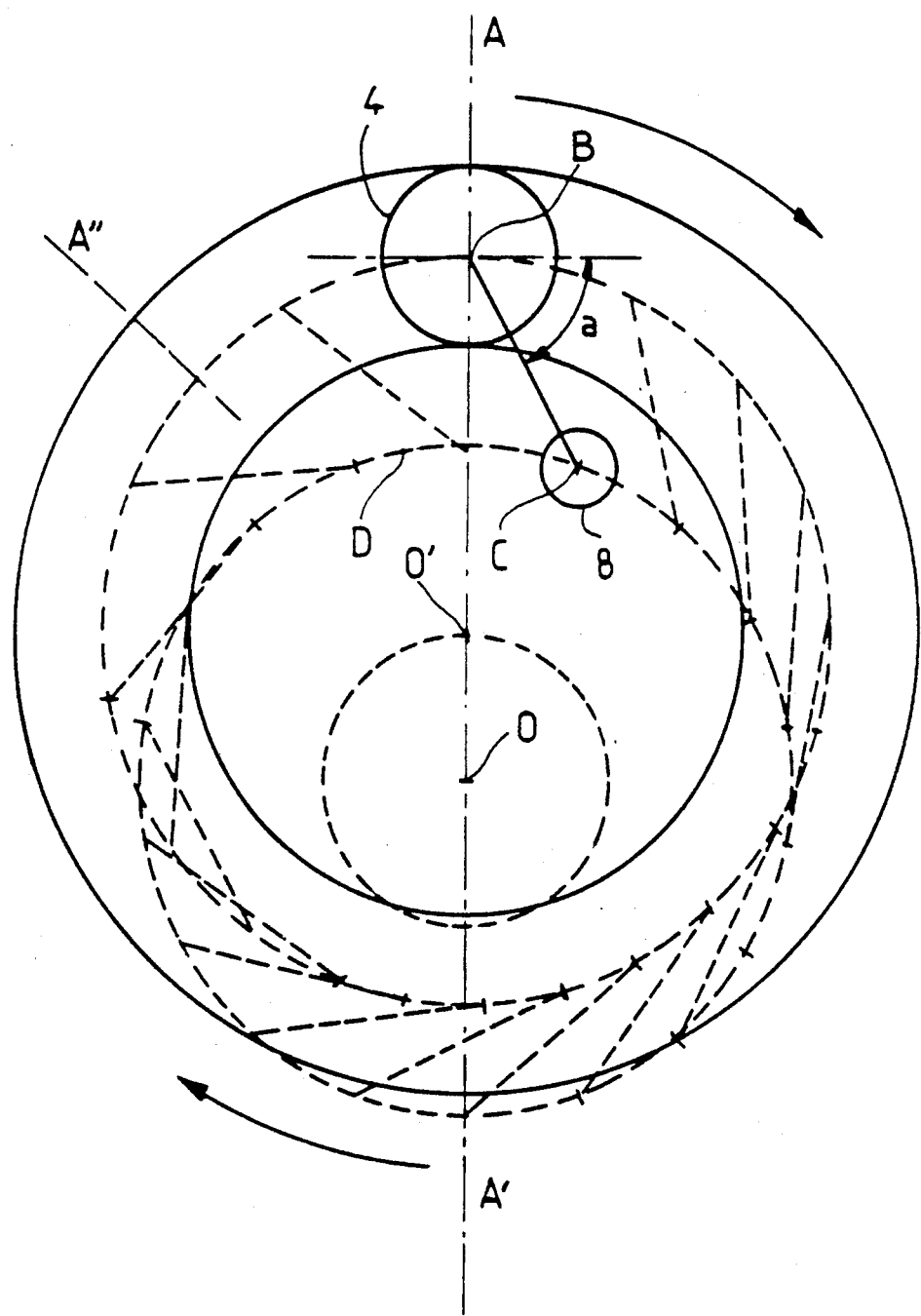
FIG. 1 is a diagram illustrating the basic characteristics of the apparatus according to the invention.
Figure 3:
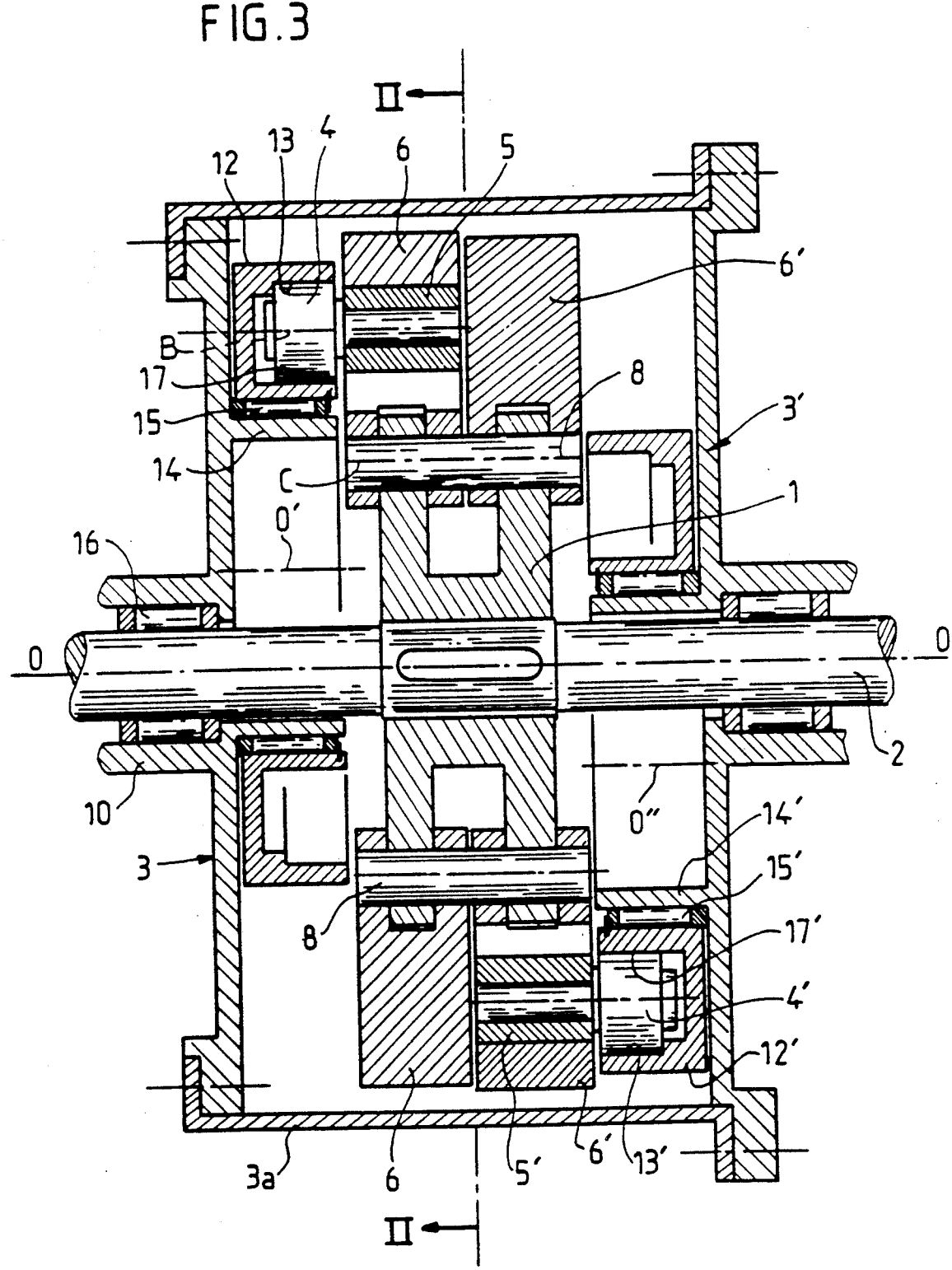
FIG. 3 is a view in axial section made along line III—III of FIG. 2.

Referring now to the drawings, and firstly to FIGS. 1 and 3, the apparatus according to the invention comprises a transverse driving hub 1 fast with a driving shaft 2 driven in rotation about a central longitudinal axis 0. The driving hub 1, of circular shape, drives in rotation a circular driven plate 3 of axis 0 and fast with a coaxial tubular driven shaft 10 surrounding the driving shaft 2. The driving hub 1 drives a plurality of rollers 4 of longitudinal axes B, i.e. parallel to axis 0, and mounted respectively to rotate freely about these axes B. Each roller 4 is mounted to rotate on a rod 5 which is articulated, about a longitudinal axis, on the outer part of a weight 6, via a longitudinal pivot 7 and each weight 6 is itself articulated on the driving hub 1, via a pivot 8, about a longitudinal axis C.

Figure 2:
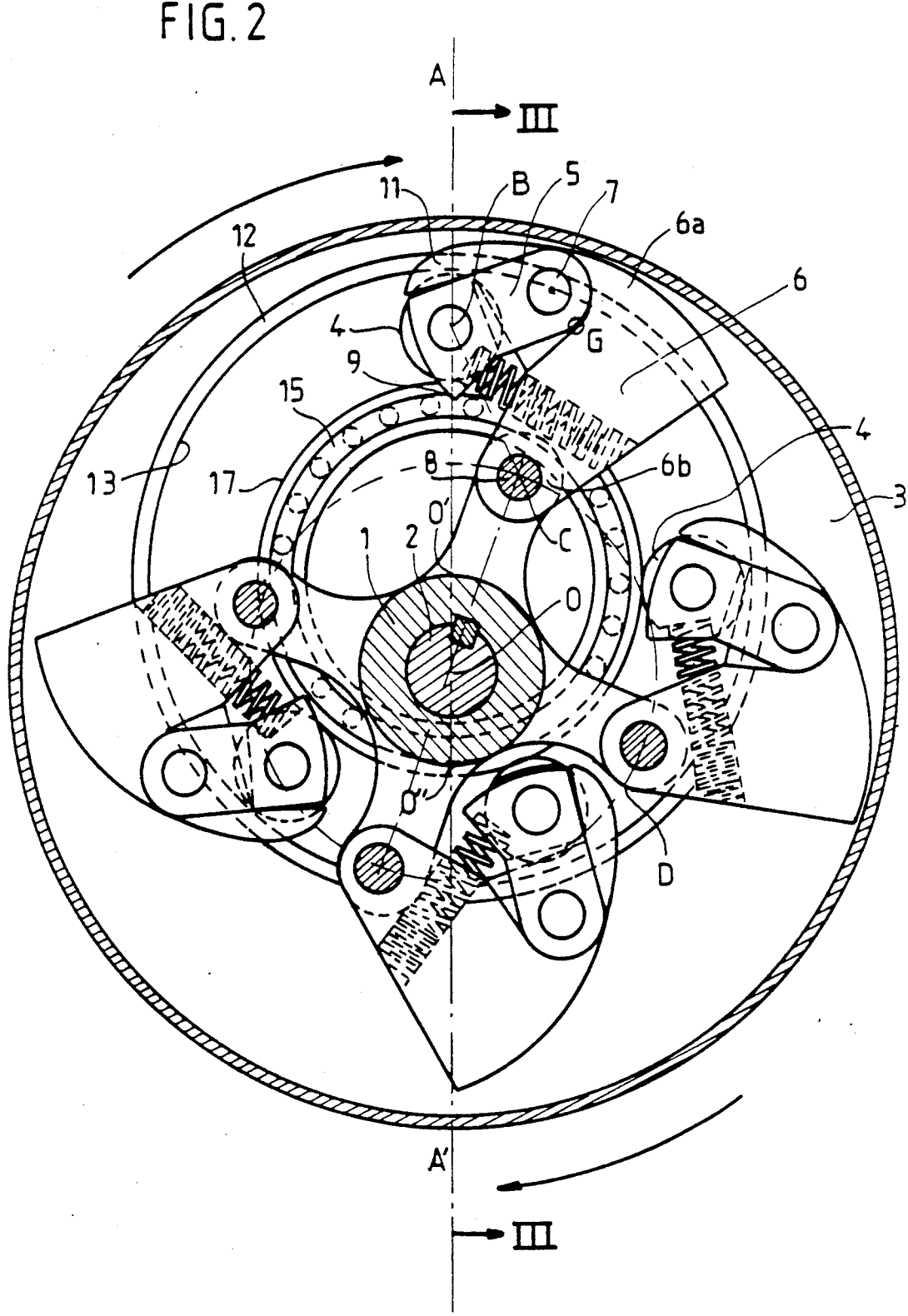
FIG. 2 is a view in transverse section, along line II—II of FIG. 3, of an embodiment of the apparatus according to the invention.

The pivot pin of each rod is borne by the weight 6 near its end opposite that which bears the pivot 8 and this axis of the rod 5 lies to the rear with respect to axis C of the pivot 8, this being considered with respect to the direction of rotation of the driving hub 1, which rotates in clockwise direction in FIGS. 1 and 2. A thrust spring 9 disposed between each rod 5 and the weight 6 which bears it, tends to move them away from one another, and the angular opening of the rod 5 is limited by a stop 11 arranged on the weight 6.

The apparatus according to the invention comprises a plurality of assemblies each constituted by a pivot 8, a weight 6, a rod 5, a spring 9 and a roller 4, the axes C of the pivots 8 being distributed uniformly over an inner circle D centered on axis 0 and of smaller radius than the greatest distance between axis B of a roller 4 and the common axis 0. Rollers 4 roll on the inner face of a cylindrical skirt 12 which constitutes a circular track 13. The cylindrical skirt 12 is borne, in its central part, by an eccentric journal 14 of axis 0', via a rolling bearing (or bearing) 15. This eccentric journal 14 is fast with the driven plate 3 of axis 0, coaxial with the driving shaft 2 on which it is centered via a rolling bearing 16.

During rolling of rollers 4 on track 13, for example upon start-up or at slow speeds of rotation, contact of rollers 4 with track 13 may be lost. In order to avoid too considerable transverse displacements of axes B of rollers 4, the apparatus comprises, on the cylindrical skirt 12, a second circular track 17, coaxial and inside the first track 13 and on which each roller 4 may roll externally, the two coaxial tracks 13, 17 allowing the rollers only a very small clearance therebetween.

In order to obtain a sufficiently large assembly of active masses subjected to the accelerations, decelerations and centrifugal forces, necessary for producing the torques, it is also provided, according to the invention, to render the weights heavier. Each of these weights 6 is thus rendered heavier in its outer part 6a most remote from its articulation 8 on the driving hub 1. This outer part 6a presents a greater width or dimension circumference-wise than that of the inner part 6b closest to the pivot axis C, as may be more readily seen FIG. 2. The center of gravity G of the weight 6/rod 5/roller 4 assembly is thus offset, with respect to the straight line BC, forwardly in the direction of rotation of rollers 4 about axis 0.

In order to obtain a perfect dynamic balancing of the apparatus and further to increase the transmissible torques, the apparatus according to the invention may comprise, according to another embodiment of the invention, a second assembly of weights 6', rods 5' and rollers 4' rolling on a third track 13' forming part of a second cylindrical skirt 12' mounted, via a roller bearing (or bearing) 15', on an eccentric journal 14' fast with a second driven plate 3' and whose axis 0'' is eccentric with respect to the longitudinal axis 0, being diametrically opposite axis 0' of the first driven plate 3 bearing the first cylindrical skirt 12 and the first track 13. This second assembly, which is disposed diametrically opposite with respect to the first assembly and being transversely offset by distance 0'0'', comprises weights 6 which are articulated, by pivots 8, on the driven hub fast with the driving shaft 2. The two weight 6,6'/rod 5,5'/roller 4,4' assemblies are placed back to back between the two driven plates 3, 3'. The two transverse driven plates 3, 3' are furthermore connected to each other by a cylindrical body in order to form a cylindrical casing 3a containing all the mobile elements of the apparatus.

The design of the apparatus according to the invention is such that the straight line BC (FIG. 1) joining axis B of rotation of a roller 4 to axis C of the pivot 8 of weight 6 on the driving hub 1, and the tangent to the circular path of the axis of rotation B of roller 4, form an angle a which, at its maximum value, is very open and which may vary, for example, from 0° to 75° in the course of a revolution, which makes it possible to use a considerable eccentricity 00' able to attain 6/10 of length BC.

In order not to have to use rollers 4 of large diameter rolling at high speeds of rotation inside track 13 or 13', it has been provided, according to the invention, to arrange a roller bearing or bearing 15 or 15' between the circular track and its axis 0 or 0''. The presence of this roller bearing 15 or 15' does not change the results mentioned above, but, by allowing the track or tracks 13, 13' to rotate at the same time as the roller 4, 4'/rod 5, 5'/weight 6, 6' assembly, rollers 4, 4' no longer have to undergo continuous and rapid rotations inside track 13, 13', but only relative clearances of small amplitude. This arrangement makes it possible to reduce the diameter of rollers 4, 4' as well as the outer dimensions of the apparatus.

Figure 4:
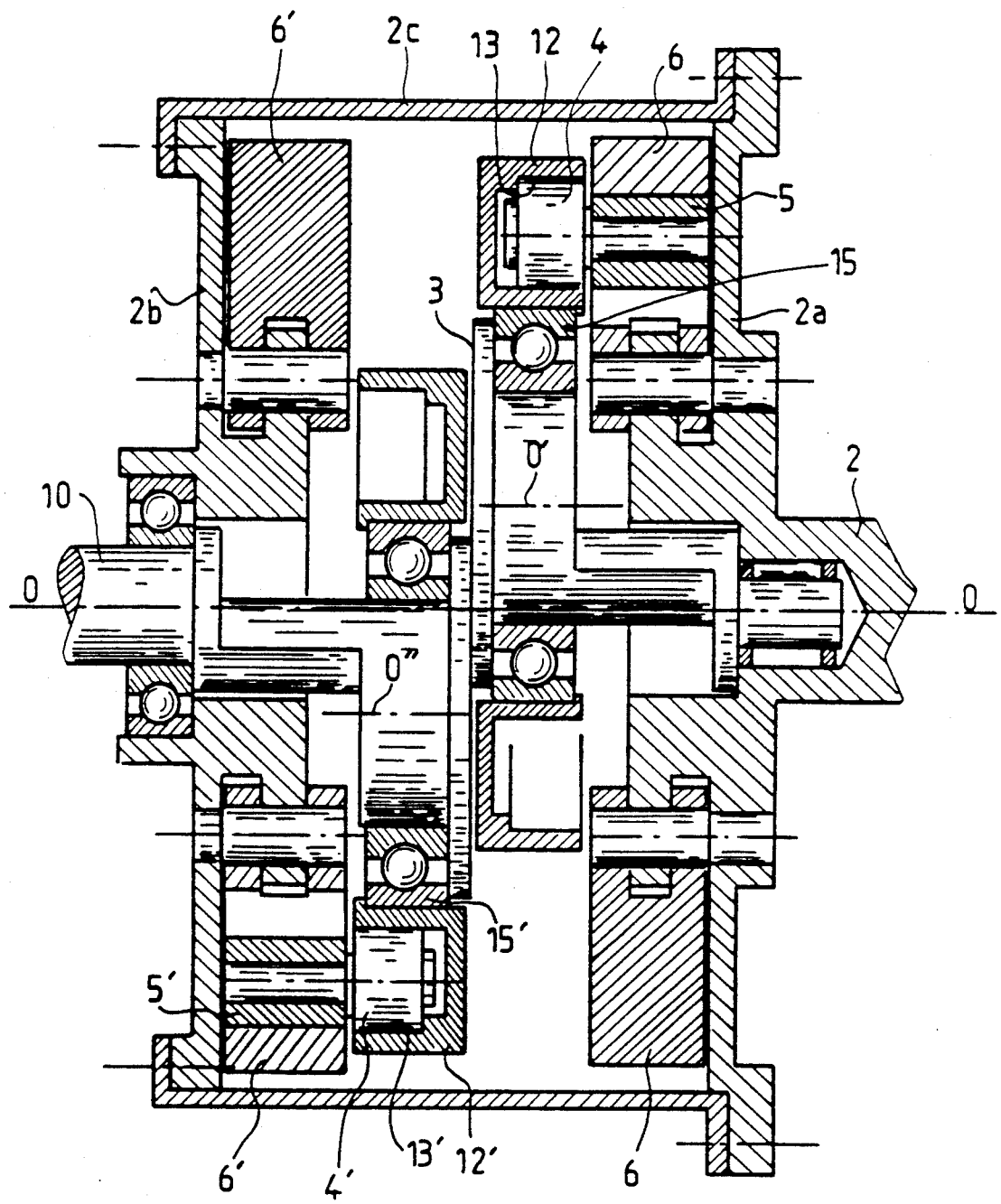
FIG. 4 is a view in axial section of another embodiment of the apparatus according to the invention.

FIG. 4 shows another embodiment of the apparatus according to the invention. Whilst maintaining the same general characteristics as described hereinbefore, it differs from the embodiment of FIG. 3 in that the driven elements: tracks 13, 13' and roller bearings 15, 15' borne by the driven shaft 10, occupy a central position, and the driving elements: weights 6, 6', rods 5, 5' and rollers 4, 4' are borne by driving plates 2a, 2b connected by a casing 2c which occupy an outer position and which contain all the elements.

FIG. 5 shows another embodiment which differs from the preceding ones in that the driving hub 1 is mounted to rotate about the central driven shaft 10, via a ring or roller bearings 18, and this driving hub 1 is driven in rotation by an intermediate plate 19 disposed between the two weight 6, 6' assemblies, and fast by its outer edge with the driving plate 20. The cylindrical skirts 12, 12' are mounted to rotate on two eccentric journals 14, 14' fast with the central driven shaft 10.

FIG. 6 is a front view of a weight/rod/roller/ spring assembly, in which weight 6 and rod 5 are spaced apart from each other by the thrust of a torsion spring 9 wound around pivot 7.

For certain industrial applications using heat engines, it is possible to adjust and stabilize the output speeds of the driven shaft 10 by using a regulator device acting on the admission of the engine and therefore on the speeds of rotation and the torques. In that case, the variation is now automatically controlled only from start-up to the pre-adjusted output speed. Consequently, the range of variation of the output speeds is thus limited, stabilizing them at a pre-displayed value.

If necessary, the invention provides a free-wheel element between the driving part and the receiving part in order to limit the range of variation to ratio 1/1 and to ensure that the motor is retained on this same ratio.

What is claimed is:

1. In an automatic mechanical transmission apparatus with continuous variation of the transmission ratio from an infinite ratio up to a ratio less than 1/1, of the type employing centrifugal forces, comprising a driving shaft and a driven shaft having a common axis, a driving hub driven by the driving shaft, at least one driven plate fast with the driven shaft and bearing at least one continuous circular track, eccentric with respect to the common axis of the driving and driven shafts, rollers which roll inside the circular track, being mounted to rotate about respective longitudinal axes, each of these rollers being borne by a rod connected to a pivot pin on the driving hub, all these pivot axes being uniformly distributed over a circle whose center lies on the common axis of the two coaxial driving and driven shafts, each rod bearing a roller is articulated on the outer part of a weight which is itself articulated on the hub fast with the driving shaft.

2. The apparatus of claim 1, wherein it comprises on the driven plate a second circular track, coaxial and inside the first track and on which each roller may roll externally, the two coaxial tracks leaving the rollers only a very small clearance therebetween.

3. The apparatus of claim 1, wherein each weight is rendered heavier in its outer part most remote from its articulation on the driving hub, this outer part, of larger width circumference-wise, bearing the articulation of the rod.

4. The apparatus of claim 1, wherein a thrust spring disposed between the rod and the weight tends to move them apart from each other and to push the rod up to a stop arranged on the weight.

5. The apparatus of claim 1, wherein the center of gravity of the weight/rod/roller assembly is offset with respect to the straight line joining the axis of the roller and the axis of the articulation, forwardly in the direction of displacement in rotation of the roller.

6. The apparatus of claim 1, wherein each rod is disposed laterally with respect to the roller and is placed, with respect to this roller, on the side opposite the driven plate.

7. The apparatus of claim 1, wherein it comprises two independent roller/track/rod/weight/articulation assemblies, these two assemblies having eccentric axes diametrically opposite with respect to the common axis of the driving and driven shafts, and these two assemblies being connected by a casing containing all the elements.

8. The apparatus of claim 1, wherein a straight line joining the axis of rotation of a roller to the axis of articulation of the weight on the driving hub, on the one hand, and the tangent to the circular path of the axis of rotation of the roller, on the other hand, form an angle (a) which, at its maximum value, is very open.

9. The apparatus of claim 1, wherein it comprises a roller bearing or a bearing between the two eccentric tracks and an eccentric journal fast with the driven plate.

10. The apparatus of claim 1, wherein the driving hub is mounted to rotate about the central driven shaft and driven by an intermediate plate disposed between the two weight assemblies and fast by its outer edge with the driving plate.

* * * * *